United States Patent
Phillips

(10) Patent No.: US 8,383,732 B1
(45) Date of Patent: Feb. 26, 2013

(54) STATIC RESISTANT SYNTHETIC CONSTRUCTION MATERIAL

(75) Inventor: Mark L. Phillips, Lafayette, LA (US)

(73) Assignee: HB Green Resources, LLC, Lafayette, LA (US)

( * ) Notice: Subject to any disclaimer, the term of this patent is extended or adjusted under 35 U.S.C. 154(b) by 76 days.

(21) Appl. No.: 13/163,117

(22) Filed: Jun. 17, 2011

(51) Int. Cl.
*C08L 23/00* (2006.01)
*C08L 23/04* (2006.01)

(52) U.S. Cl. ......... 525/240; 525/166; 525/92 F; 525/98; 525/177; 525/191; 524/495; 524/496; 524/543; 524/580; 524/581

(58) Field of Classification Search .................. 524/493, 524/495, 496, 543, 580, 581; 525/166, 92 F, 525/98, 191, 240; 404/19, 35
See application file for complete search history.

(56) References Cited

U.S. PATENT DOCUMENTS

| | | | |
|---|---|---|---|
| 4,764,428 A * | 8/1988 | Gloyer | 428/402 |
| 5,298,540 A * | 3/1994 | Pauquet et al. | 524/94 |
| 6,380,309 B1 | 4/2002 | Parker et al. | |
| 2004/0235970 A1 * | 11/2004 | Smith et al. | 521/46.5 |

OTHER PUBLICATIONS

Handbook of Plastics Recycling, Editor: Francesco La Mantia, Published in 2002, Rapra Technology Limited, pp. 66 and 229.*

\* cited by examiner

*Primary Examiner* — James J Seidleck
*Assistant Examiner* — Deve E Valdez
(74) *Attorney, Agent, or Firm* — Buskop Law Group, PC; Wendy Buskop

(57) ABSTRACT

A static resistant synthetic inter-connectable structural formulation which can support vehicles, heavy equipment, drilling rigs while providing static charge dissipation, resistance to corrosive materials consisting of polyethylene; polyethylene terephthalate, styrene-butadiene rubber; an antistatic material that partially protrudes through a formed outer surface of the formulation; and an ultraviolet stabilizer material.

8 Claims, No Drawings

STATIC RESISTANT SYNTHETIC CONSTRUCTION MATERIAL

FIELD

The present embodiments generally relate to a formulation for a static dissipation construction material mat from recyclable plastic and tire material that can sustain loads ranging from a ton to several tons without deforming.

BACKGROUND

A need exists for a formulation that can be extruded to produce a static resistant synthetic construction material capable of resisting the absorption of oil, chemicals, and toxic materials without deforming or degrading while sustaining a several ton load.

A need exists for a formulation that uses recycled plastic and recycled rubber that provides static charge dissipation.

The present embodiments meet these needs.

BRIEF DESCRIPTION OF THE DRAWINGS

N/A

DETAILED DESCRIPTION OF THE EMBODIMENTS

Before explaining the present formulation in detail, it is to be understood that the formulation is not limited to the particular embodiments and that it can be practiced or carried out in various ways.

The present embodiments relate to a formulation that can be used to produce a synthetic construction material that can dissipate static charge.

The static resistant synthetic construction material can be used to make a modular, static resistant, and even non-skid structural mats for supporting 5 tons of load without deforming.

The formulation can be used for creating a material that can resist deformation when treads of earth moving equipment are used on its surface while providing a non-skid, static charge resistant surface for humans.

The formulation is created to dissipate static charge. Static electricity can result in electrostatic discharges, which can cause fires and explosions.

The formulation can be used with derricks or drilling structures to reduce static charge buildup on the surface articles, such as support mats used to support a drilling rig. For example, the formulation can be used on modular, static resistant structural mats that are used beneath drilling rigs and between the rigs and the earth to reduce static charge buildup and to conduct static charge from the rig to the earth assisting in grounding the rig.

The formulation resists corrosion from rust and oil. For example, the formulation does not absorb oil causing it to degrade.

An embodiment of the present formulation can produce a surface which does not absorb oil or other chemical toxins and prevents toxins from spreading when construction materials formed from the formulation are moved from place to place.

The formulation provides improved safety to human life at the drilling site by providing a resultant material that can be cut forming at least one non-slip groove and non-slip bevels in the resultant material that prevents slipping and falling. In embodiments, additional grooves can be formed in the structural boards.

The formulation produces, after mixing and heating, a material that allows static resistant materials to protrude in segments through the outer surface of the formulation thereby effectively reducing the effect of stray electrical currents from connecting equipment and transferring those stray electrical currents to the earth or to a foundation on which the construction materials are resting.

The formulation uses recycled materials enabling the formulation to be produced at a significant cost saving while simultaneously reducing the carbon footprint of the overall formulation.

The formulation can use recycled tire material and recycled detergent bottles, thereby creating a lower fossil fuel foot print. The term "recycled tire material" and "recycled detergent bottles" refer to post consumer waste.

The formulation can involve using a blend of ground particles from about 75 percent to 92 percent by weight based on the total blend of ground plastic particles.

The formulation can include sheared or small particle recycled detergent bottles, such as TIDE™ bottles.

The formulation creates a material with a unique surface that allows static resistant material to protrude in segments of the outer surface and effectively prevent stray electrical currents.

In an embodiment, the formulation, while still warm can have incorporated into it a non skid coating disposed on at least the top layer in either a continuous or a discontinuous manner to prevent slip and fall accidents. The coating material can be silica based or crumb rubber, a ethyl vinyl acetate with polyamide (nylon) blend or combinations thereof.

The ground plastic particles can have diameters ranging from about 1/16 of an inch to about 1/4 of an inch. The ground plastic particles are blends of high density polyethylene (HDPE) particles, low density polyethylene (LDPE) particles, and polyethylene terephthalate particles.

The blend ratio of polyethylene to polyethylene terephthalate particles can range from 10:1 to 1:10.

The formulation can use materials that are known to be difficult to degrade, such as detergent bottles and tires, which can also be difficult to use and to transform these components into a usable product.

By using recycled tire material and recycled detergent bottles in the formulation the post consumer waste that has been removed from the waste stream and otherwise could end up in creeks, on beaches creating trash and litter.

In embodiments, the ground styrene-butadiene rubber particles can be from about 0.5 percent by weight to about 3.9 percent by weight based on the total blend. The ground styrene-butadiene rubber particles can have a diameter from about 1/16 of an inch to about 1/4 of an inch. The ground styrene-butadiene rubber can come from tires, which can be cut using a high shear cutting device, such as a continuous feed high speed cutter.

Another component of the formulation can be from about 2 percent by weight to about 10 percent by weight of antistatic particles, which can be used for preventing static charge buildup in the resultant structural boards.

Carbon black can be used as the antistatic component. The antistatic particles can have a diameter from about 1/16 of an inch to about 1/4 of an inch.

In embodiments, an ultraviolet stabilizer material can be used from about 0.5 percent by weight to about 5.0 percent by weight based on the total blend. The ultraviolet stabilizer material can have a diameter from about 1/16 of an inch to about 1/4 of an inch.

The resultant formulation can be referred to herein as the "total blend." The total blend can be placed into an extruder, such as a single screw banbury type extruder for heating and mixing using a temperature from about 200 degrees Fahrenheit to about 385 degrees Fahrenheit.

The extruder heats and mixes until the blend of ground particles are extrudable into a static resistant structural board, which can have the antistatic material partially protruding through an outer surface of the extrudate, which can result in the static resistant structural board.

In embodiments, the antistatic particles can be blended and can be randomly connected to each other, which unexpectedly facilitates dissipation of static charge buildup in the structural boards, and creating a density of at least 10 particles per square inch. The voltage can be dissipated when the voltage is from about $10^{-5}$ to about $10^{-12}$ volts.

In one or more embodiments, the antistatic particles can be dissipaters that prevent static electrical buildup and maintain a voltage dissipation at or below $10^{-11}$ volts.

While the extrudate is still warm, the extrudate can be coated with a slip resistant coating to ensure material integration of the slip resistant coating into the top surface rather than simply coating on the top surface.

In another embodiment, the slip resistant material can be incorporated into the blend while in the extruder.

In an embodiment, the static resistant board can be at least partially embedded and over-coated with a slip resistant material. Nylon, low density polyurethane, and ethylene vinyl acetate (EVA) can be used as the slip resistant material.

In an embodiment, the slip resistant coating is deposited at least partially, such as over about 50 percent to about 75 percent of the surface area of the extrudate while the static resistant extrudate cools about 10 degrees Fahrenheit to about 30 degrees Fahrenheit forming a partially slip resistant material. The slip resistant coating can then be attached to the extrudate without the need of fasteners or adhesives, providing partial encapsulation of the slip resistant material to ensure it stays on the extrudate.

The integration can be homogenously throughout the material and protruding on the surface for maximum effect in reducing static charge buildup.

In an embodiment, the still warm structural formulation can be kept at a temperature from about 200 degrees Fahrenheit to about 385 degrees Fahrenheit and then coated with the slip resistant material allowing the slip resistant material to be sealed into the formulation.

The structural formulation can support vehicles, heavy equipment, drilling rigs with static charge resistance, resistance to corrosive materials.

Yet in another embodiment, the formulation can use from about 0.01 percent by weight to about 3.0 percent by weight non-caustic soda of the total weight. The non-caustic soda, such as baking soda can be used to prevent curling of the resultant construction material in temperatures below 45 degrees Fahrenheit.

In an embodiment, the formulation can include: (i) 50 percent by weight to 92 percent by weight of ground plastic particles of high density polyethylene particles; and polyethylene terephthalate particles in a 1:10 ratio with the polyethylene from 100 percent shredded post consumer TIDE™ detergent bottles; (ii) 0.5 percent by weight to 3.9 percent by weight of ground styrene-butadiene rubber particles from 100 percent shredded post consumer tires; (iii) from 2 percent by weight to 10 percent by weight of antistatic particles for preventing static charge buildup, which can be carbon black; (iv) 0.5 percent by weight to 5 percent by weight of ultraviolet stabilizer material, and wherein these first four ingredients of the formation can then be placed into an extruder for heating and mixing using a temperature from about 200 degrees Fahrenheit to about 385 degrees Fahrenheit until the ingredients are extrudable into an extrudate wherein the static resistant material partially protrudes through an outer surface of the extrudate; and then including (v) 0.01 percent by weight to 6 percent by weight of a slip resistant material based on the total blend applied only to the extrudate while warm, partially encapsulating a layer of the non skid material that is added to the formulation while the extrudate is at a temperature from about 200 degrees Fahrenheit to about 385 degrees Fahrenheit.

In this embodiment, the formulation can provide boards with high strength and high load support.

The antistatic material can then be blended in the formulation and creates various random particle connections with other antistatic particles to facilitate dissipation of static charge buildup in the structural boards, and creating a density of at least 10 particles per square inch.

The following are various formulations which can be usable herein for construction materials using the general formulation and can include: (i) from 50 percent by weight to 92 percent by weight based on the total blend of ground plastic particles, of high density polyethylene particles; and polyethylene terephthalate particles, or combinations thereof in a 1:10 ratio; (ii) from 0.5 percent by weight to 3.9 percent by weight based on the total blend of ground styrene-butadiene rubber particles; (iii) from 2 percent by weight to 10 percent by weight based on the total blend of antistatic particles for preventing static charge buildup, wherein the antistatic particles have a diameter from about 1/8 of an inch to about 1/4 of an inch to allow for partial protrusion through a formed outer surface; (iv) from 0.5 percent by weight to 5 percent by weight based on the total blend of an ultraviolet stabilizer material; and (v) from 0.001 percent by weight to 6 percent by weight based on the total weight of the blend of a slip resistant coating.

Examples of various specific formulations follow:

Example 1

The ground blend consists of 91 percent by weight based on the total blend of ground plastic particles, of which 40 percent is high density polyethylene particles and 60 percent is polyethylene terephthalate particles. (ii) 3 percent by weight based on the total blend of ground styrene-butadiene rubber particles; (iii) 2 percent by weight based on the total blend of an antistatic particles for preventing static charge buildup, wherein the antistatic particles have a diameter from about 1/8 of an inch to about 1/4 of an inch to allow for partial protrusion through a formed outer surface and randomized particle connections with each other to facilitate dissipation of static charge buildup in the structural boards, and creating a density of at least 10 particles per square inch.

To the plastic particles are also added 3 percent by weight based on the total blend of an ultraviolet stabilizer material; and 1 percent by weight based on the total weight of the blend of a slip resistant coating.

Example 2

The ground blend consists of 91 percent by weight based on the total blend of ground plastic particles which are 60 percent high density polyethylene particles; and 40 percent polyethylene terephthalate particles; 2 percent by weight based on the total blend of ground styrene-butadiene rubber particles; 4 percent by weight based on the total blend of an antistatic particles for preventing static charge buildup, wherein the antistatic particles have a diameter from about 1/8 of an inch to about 1/4 of an inch to allow for partial protrusion through a formed outer surface.

It should be noted that the antistatic particles can be blended during mixing creating randomized particle connections with each other to facilitate dissipation of static charge buildup in the structural boards, and creating a density of at least 10 particles per square inch.

In this example, there is also added to the plastic particles 1.5 percent by weight based on the total blend of an ultraviolet stabilizer material; and 1.5 percent by weight based on the total weight of the blend of a slip resistant material such as nylon or EVA or combinations thereof.

Example 3

The ground blend consists of 79.5 percent by weight based on the total blend of ground plastic particles having 10 percent high density polyethylene particles; and 90 percent polyethylene terephthalate particles, (ii) 3.5 percent by weight based on the total blend of ground styrene-butadiene rubber particles; (iii) 10 percent by weight based on the total blend of an antistatic particles for preventing static charge buildup, wherein the antistatic particles have a diameter from about 1/8 of an inch to about 1/4 of an inch to allow for partial protrusion through a formed outer surface and randomized particle connections with each other to facilitate dissipation of static charge buildup in the structural boards, and creating a density of at least 10 particles per square inch.

To the plastic particles is also added 4 percent by weight based on the total blend of an ultraviolet stabilizer material; and 3 percent by weight based on the total weight of the blend of a nylon slip resistant material.

To all of these examples, can be added from 0.01 percent by weight to 3.0 percent by weight of the total weight, of a non-caustic soda with the ground plastic particles to prevent curling. The non-caustic soda can be baking soda. The non-caustic soda can prevent curling from temperature variations from the temperatures of materials on the mat to the outside temperatures.

In an embodiment, the method of using the formulation can include the step of colorizing the boards based on content of plastic or crumb rubber in the boards, to distinguish arctic boards from temperate climate boards, to distinguish between boards that support loads of 1 ton to loads of 5 tons. In embodiments, the method can also use lag screws to provide a highly conductive conduit in forming the mats.

Example 4

A black structural board might use 1000 pounds of colored high density polyethylene which is post consumer, with 35 pounds of shredded recycled rubber plus 1/4 pounds of sodium bicarbonate (to prevent curling) with 1 pound of black colorant plus ultraviolet (UV) stabilizer plus antistatic material.

Example 5

A black structural board might use 1000 pounds of colored high density polyethylene which is post consumer, with 35 pounds of shredded recycled rubber plus 1/4 pounds of sodium bicarbonate (to prevent curling) with 1 pound of black colorant plus antistatic material.

Example 6

A green structural board might use 1000 pounds of colored high density polyethylene which is post consumer, with 35 pounds of shredded recycled rubber plus 1/4 pounds of sodium bicarbonate (to prevent curling) with 2 pounds of green colorant plus UV stabilizer, plus antistatic material.

Example 7

In this example, ground plastic particles made of 15 percent by weight high density polyethylene is used with 72 percent by weight low density polyethylene and 5 percent by weight polyethylene terephthalate. 2 percent by weight of ground rubber particulates can then be added which solely consist of post consumer shredded tires of styrene-butadiene rubber.

To these components are added 1/2 percent by weight baking soda, and 5 percent by weight slip resistant material made up of 2.5 percent by weight polyamide (a nylon 6), with 2 and 1/2 percent by weight ethyl vinyl acetate and 1/2 percent by weight of an antistatic material consisting essentially of carbon black.

While these embodiments have been described with emphasis on the embodiments, it should be understood that within the scope of the appended claims, the embodiments might be practiced other than as specifically described herein.

What is claimed is:

1. A formulation for making static charge dissipation, and corrosive resistant synthetic structural materials configured to support vehicles, heavy equipment, and drilling rigs, the formulation comprising:
   a. from 50 percent by weight to 92 percent by weight of ground plastic particles, based on the total weight of the composition, wherein the plastic particles comprise:
      i. polyethylene particles;
      ii. polyethylene terephthalate particles; or
      iii. combinations thereof in ratios from 1:10 to 10:1;
   b. from 0.5 percent by weight to 3.9 percent by weight based on the total weight of the composition, of ground styrene-butadiene rubber particles;
   c. from 2 percent by weight to 10 percent by weight based on the total weight of the composition of antistatic carbon black particles with diameters between $1/16^{th}$ of an inch to 1/4 of an inch for preventing static charge buildup, wherein the antistatic carbon black particles allow for partial protrusion of the antistatic carbon black particles through a formed outer surface of the resultant formulation, and wherein the antistatic carbon black particles have randomized particle connections with each other to facilitate dissipation of static charge buildup in the formulation, and wherein the formulation has at least 10 antistatic carbon black particles per square inch of the formulation; and
   d. from 0.5 percent by weight to 5 percent by weight based on the total weight of the composition, of an ultraviolet stabilizer material; and
   e. from 0.01 percent by weight to 6 percent by weight based on the total weight of the composition, of a slip resistant material, and the slip resistant material has particles which each have a diameter ranging from 1/16 of an inch to 1/4 of an inch dispersed throughout the formulation.

2. The formulation of claim 1, wherein the antistatic carbon black particles are dissipaters that prevent static electrical buildup and maintain a voltage dissipation at or below $10^{-11}$ volts.

3. The formulation of claim 1, wherein the ground plastic particles have diameters ranging from 1/16 of an inch to 1/4 of an inch.

4. The formulation of claim 1, wherein the ground styrene-butadiene rubber particles have a diameter ranging from 1/16 of an inch to 1/4 of an inch.

5. The formulation of claim 1, wherein the ultraviolet stabilizer material has a diameter ranging from 1/16 of an inch to 1/4 of an inch.

6. The formulation of claim 1, further comprising from 0.01 percent by weight to 3 percent by weight based on the total weight of the composition, of a non-caustic soda to prevent curling at a temperature less than 45 degrees Fahrenheit.

7. The formulation of claim 1, further comprising from 0.01 percent by weight to 3 percent by weight based on the total weight of the composition, of a pigment.

8. The formulation of claim 1, wherein the slip resistant material is: a silica based material, a rubber, a polyamide and ethyl vinyl acetate blend, or combination thereof.

* * * * *